United States Patent [19]

Lindner

[11] Patent Number: 4,487,874
[45] Date of Patent: Dec. 11, 1984

[54] POLYCARBONATE PROCESSING
[75] Inventor: Robert A. Lindner, Weehawken, N.J.
[73] Assignee: Henkel Corporation, Minneapolis, Minn.
[21] Appl. No.: 484,790
[22] Filed: Apr. 14, 1983
[51] Int. Cl.$^3$ .......................... C08K 5/11; C08L 69/00
[52] U.S. Cl. .................................. 524/311; 524/611; 560/199
[58] Field of Search ................. 524/311, 611; 560/199
[56] References Cited

U.S. PATENT DOCUMENTS

| | | |
|---|---|---|
| 2,551,767 | 5/1951 | Shechter ............................. 560/199 |
| 2,588,194 | 3/1952 | Arundale ............................ 560/199 |
| 3,000,917 | 9/1961 | Babayan ............................. 560/199 |
| 3,048,608 | 8/1962 | Girard ................................ 560/199 |
| 3,135,785 | 6/1964 | Fritz .................................... 560/199 |
| 3,223,671 | 12/1965 | Kraft .................................. 524/311 |
| 3,809,712 | 5/1974 | Yetter ................................ 560/199 |
| 3,984,445 | 10/1976 | Isa ..................................... 560/199 |
| 4,082,715 | 4/1978 | Mercier .............................. 524/611 |
| 4,143,024 | 3/1979 | Adelmann ......................... 524/611 |
| 4,243,575 | 1/1981 | Myers ................................ 524/611 |
| 4,425,458 | 1/1984 | Lindner ............................. 524/314 |

FOREIGN PATENT DOCUMENTS

| | | | |
|---|---|---|---|
| 581563 | 8/1959 | Canada ............................... 560/199 |
| 2507748 | 9/1976 | Fed. Rep. of Germany ...... 524/311 |
| 2729485 | 1/1978 | Fed. Rep. of Germany ...... 524/611 |
| 1507161 | 12/1967 | France .............................. 560/199 |
| 2310403 | 12/1976 | France .............................. 524/311 |
| 697412 | 12/1950 | United Kingdom .............. 560/199 |
| 663566 | 12/1951 | United Kingdom .............. 560/199 |
| 1122466 | 8/1968 | United Kingdom .............. 560/199 |

Primary Examiner—C. Warren Ivy
Attorney, Agent, or Firm—Ernest G. Szoke; Patrick J. Span; J. Daniel Wood

[57] ABSTRACT

The lubricant which is incorporated into the polycarbonate resin is a complex ester formed by partial esterification of pentaerythritol with a $C_5$ to $C_9$ aliphatic carboxylic acid followed by reaction with a $C_4$ to $C_8$ aliphatic dicarboxylic acid to form a material represented by the structural formula:

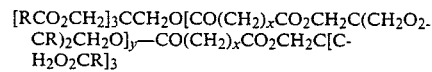

wherein the above formula y has an average value of from 3 through 12; x has a value of 2 to 6 and R is an aliphatic hydrocarbon group of from 5 to 9 carbon atoms.

10 Claims, No Drawings

POLYCARBONATE PROCESSING

BACKGROUND OF THE INVENTION

1. Field of the Invention

This invention relates to the processing of shaped or molded plastic articles.

2. Description of the Art Practices

It has long been known to form polycarbonate articles using a variety of resins as later described. An advantage to polycarbonate resins is that these materials may be formulated to be clear or tinted to give various shaped articles which are still substantially transparent.

It has also been found, in processing polycarbonates that a variety of materials used to aid in obtaining the polycarbonate article have deleterious effect on the polycarbonate resin, particularly effecting the clarity of the shaped article. For a general discussion of polycarbonate resin processing the reader is directed to the U.S. patent application, Ser. No. 366,960, filed Apr. 9, 1982 by Lindner et al now U.S. Pat. No. 4,425,458. The reader is also directed to U.S. patent application, Ser. No. 366,959, filed Apr. 9, 1982 also to Lindner et al.

It is also to be noted that the compound shown at (b) in the Summary is known where R is 16 or 18 carbons.

Throughout the specification and claims, percentages and ratios are by weight, temperatures are degrees Celsius and pressures are gauge.

SUMMARY OF THE INVENTION

This invention describes a process for the manufacture of a polycarbonate article including the steps of:

(a) obtaining a polycarbonate resin;

(b) mixing with the polycarbonate resin a sufficient lubricating amount of a complex ester of the structural formula:

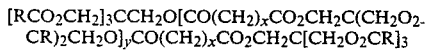

and, (c) the polycarbonate article is thereafter formed from a mixture of (a) and (b), wherein the above formula y has an average value of from 3 through 12; x has a value of 2 to 6 and R is from 5 to 9 carbon atoms.

Also described is a composition of matter which is represented by the formula:

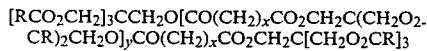

wherein the above formula y has an average value of from 3 through 12; x has a value of 2 to 6 and R is from 6 to 9.

DETAILED DESCRIPTION OF THE INVENTION

The first aspect of the invention is obtaining a suitable polycarbonate resin which may be utilized with the present invention.

The polycarbonates with which the present lubricants are effective include homopolycarbonates and copolycarbonates which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis(hydroxyphenyl)-sulphoxides, bis(hydroxyphenyl)-sulphones and a,a-bis-(hydroxyphenyl)diisopropyl-benzenes, as well as their nuclear alkylated and nuclear-halogenated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846; in German Offenlegungsschriften (German Published Specifications) Nos. 1,570,703; 2,063,050; 2,063,052; 2,211,956; and 2,211,957 in French Patent Specification No. 1,561,518 and in the monograph "H. Schnell, Chemistry and Physics of Polycarbonats, Interscience Publishers, New York, 1964".

Preferred bisphenols are those of the formula I

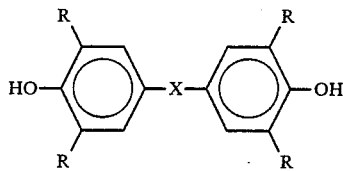

in which

R is identical or different and denotes H, $C_1$–$C_4$-alkyl Cl or Br and in which X is a bond, $C_1$–$C_8$ alkylene, $C_2$–$C_8$-alkylidene, $C_5$–$C_{15}$-cycloaklylene, $C_5$–$C_{15}$-cycloalkylidene, —$SO_2$— or formula II as shown below:

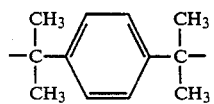

Examples of these bisphenols are 4,4'-dihydroxydiphenyl, 2,2-bis(4-hydroxyphenyl)-propane, 2,4-bis(4-hydroxyphenyl)-2-methylbutane, 1,1-bis-(4-hydroxyphenyl)-cyclohexane, a,a-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl)-cyclohexane, a,a-bis-(3,5-dimethyl-4-hydroxyphenyl)-p-diisopropyl-benzene, 2,2-bis-(3,5-dichloro-4-hydroxyphenyl)-propane and 2,2-bis(3,5-dibromo-4-hydroxyphyenyl)-propane.

Examples of particulary preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(4-hydroxyphenyl)-propane and one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic polycarbonates can be prepared in accordance with known processes, such as, for example, in accordance with the melt trans-esterification process from bisphenols and diphenyl carbonate and the two-phase boundary process from bisphenols and phosgene, as described in the above mentioned literature.

The aromatic high-molecular weight polycarbonates can be branched due to the incorporation of small amounts, preferably of between 0.05 and 2.0 mol % (relative to diphenols employed), of trifunctional or more than trifunctional compounds, especially compounds with three of more phenolic hydroxyl groups.

Polycarbonates of this type are described, for example, in German Offenlegungsschriften (German Published Specifications) Nos. 1,570,533; 1,595,762; 2,116,974 and 2,113,347; British Patent Specification No. 1,079,821, U.S. Pat. No. 3,544,514 and German Patent Application No. P 25 00 092.4.

Some examples of compounds with three or more than three phenolic hydroxyl groups which can be used are phloroglucinol, 4,6-dimethyl-2,4,6-tri-(4-hydroxyphenyl)-heptane-2, 4,6-dimethyl-2-4,6-tri-(4-hydroxyphenyl)-heptane, 1,4,5-tri(4-hydroxphenyl)-benzene, 1,1,1-tri-(4-hydroxphenyl)-ethane, tri(4-hydroxyphenyl)-phenylmethane, 2,2-bis-[4,4-bis(4-hydroxyphenyl)-cyclohexyl]-propane, 2,4-bis(4-hydroxyphenylisopropyl)phenol, 2,6-bis-(2-hydroxy-5'-methylbenzyl)-4-methyphenol, 2-(4-hydroxyphenyl)-2-(2,4-dihydroxphenyl)-propane, hexa[4-(4-hydroxyphenylisopropyl)phenyl]orthoterphthalic acid ester, tetra-(4-hydroxyphenyl)-methane, tetra-(4-(4-hydroxyphenylisopropyl)phenoxy)-methane and 1,4-bis[(4',4''-dihydroxytriphenyl)methyl]benzene. Some of the other trifunctional compounds are 2,4-dihydroxybenzoic acid, trimesic acid, cyanuric chloride and 3,3-bis-(4-hydroxphyenyl)-2-oxo-2,3-dihydroindole.

The aromatic high-molecular polycarbonates should as a rule have mean weight-average molecular weights M of at least 10,000, especially of 10,000 to 200,000, preferably of 20,000 to 80,000, determined by measuring the relative viscosity in $CH_2Cl_2$ at 25 degrees C. and a concentration of 0.5% by weight.

The thermoplastic polycarbonate molding compositions find use in several areas. Such examples of use for the polycarbonates of the present invention utilizing the mold release agents include the electrical industry and the optical field such as the stripping of sockets, coiled bodies, complicated housings, projector housings, switch cabinet bottoms and other similar applications.

The complex ester of the present invention, component (b), is utilized with the polycarbonate in the manner of similar prior polycarbonate formulations. The level of use of the complex ester to the polycarbonate is from about 0.01% to about 1%, preferably from about 0.10% to about 0.70% by weight of the polycarbonate.

The next aspect of the present invention is the complex ester.

The complex ester as represented by the structural formula given in the Summary of the Invention is further described as follows. The ester is formed by reacting pentaerythritol with a relatively short-chained fatty acid as further described in the Summary. The reaction is conducted so that the pentaerythritol is not fully deprived of all of the hydroxyl hydrogen atoms in forming the partial ester. Thereafter, this partial ester of pentaerythritol is further reacted with a short chain saturated organic diacid. The diacid cross-links the various partial esters of pentaerythritol and is controlled such as to give a molecular distribution within the value of the present invention.

The particular values on the partial ester of the present invention are that the value of x will be 2 to 6, preferably 2 or 4 thereby describing the partial ester as having a succinic or adipic acid backbone. The value of y as averaging 3 to 12, preferably 5, 6 or 7 indicates that the reaction has been controlled such that the ratios used of the diacid and the partial ester of pentaerythritol are such as to give an average repeating chain length as defined in the Summary.

The value of R is critical in the present invention. First, the acids used to partially esterify the pentaerythritol are preferably saturated materials. That is, unsaturated acids tend to break down and are not as useful in polycarbonate resin systems which may be exposed to ultraviolet light. Thus, to avoid discoloration the polycarbonate should not contain an unsaturated acid at any point where the unsaturated acid will remain in the polycarbonate resin. Secondly, the value of R as to the chain length should be between 5 and 9 carbons and desirably should also be linear. It is most preferred that R have a value of 7 or 9 carbons corresponding to capric and caprylic acids.

Among the advantages of the present invention are that the polycarbonate resin will be sufficiently lubricated to give good mold release and clarity. A distinct advantage in the present invention is that the materials herein, unlike prior art compounds, are liquid at room temperature. Therefore, mixing and storage of the materials which heretofore would have been a flake material is quite simple.

EXAMPLE I

A complex ester useful in the present invention is prepared as follows. Into a reaction vessel of suitable size are added 408 parts of pentaerythritol, 1314 parts of caprylic acid and 3 parts of tin oxide. The reaction mixture is heated to a range of between 115° C. and 180° C. and the water from the reaction is recovered.

The reaction is substantially complete after a period of about 4½ hours. The acid value of the product is 70.5. The partial ester formed above is then converted to the complex ester by reacting 1281 parts of the partial ester formed above with 216 parts of adipic acid and 3 gms of tin oxide. This reaction is conducted over a period of seven hours at a temperature of 210° C. The acid value of the end product is 25.2, a hydroxyl value of 33.24. The estimated polymeric value of y is 6.

EXAMPLE II

A reaction is conducted substantially similar to Example I where 239 parts of pentaerythritol and 760 parts of capric acid are added to a reaction vessel together with 2.2 parts of tin oxide.

This mixture is heated to a temperature of 200° C. and the reaction is continued for a period of six hours. When the reaction is substantially complete the acid value is 5.33 and the hydroxyl value is 98.1.

The partial ester formed above in the amount of 1052 parts is reacted with 113.5 parts of adipic acid. The reaction mixture is heated to 180° C. and is substantially complete after about 7.5 hours. At the end of the reaction the acid value is 27.72 and the estimated average value of y is 6.

EXAMPLE III

A polycarbonate obtained under the trademark MERLON M 50 F-1000 had included therein 0.2 parts by weight of the lubricant of Example II. The lubricant was blended onto hot pre-dried polycarbonate resin granules in a Hobart mixer.

The blend of the lubricant and the polycarbonate are then intimately compounded on a single screw 1¼ inch TEC extruder and pelletized.

The combined lubricant and polycarbonate resin is tested for mold release capabilities by using a 28 ton Arburg Injection Molding machine equipped with a vertical 0.79 ounce barrel to inject at the mold parting lines. The machine is equipped with a hydraulic core pull employing a 1,000 pound load cell to measure the force to withdraw the core from the molding. Mold part geometry consists of a 1 inch outside diameter by 2½ inch long hollow cylinder having 8 longitudinal splines on the core side to increase metal-plastic interface area. The molding is done with a Controlled Process, Inc. 3-stage process control to control and monitor the fill-pack-hold times and pressures. Holding pressures vary to obtain a range of residual mold pressures at the instant of mold core withdrawal. Mold release force versus residual mold pressure data can thus be obtained over the range of hydraulic holding pressures available.

The molding conditions employed are a constant barrel temperature of 300° C. and a mold temperature of 95° C. The fill and pack pressures were held constant at Process Control set pressures of 10,000 and 1,000 psi, which resulted in very consistant peak mold pressures, fill times, and pack times.

The following Table I shows the variation of mold release in pounds and residual pressure in psi for the product of Example III versus a polycarbonate control containing no lubricant.

TABLE I

| Residual Pressure | Release Pressure with Lubricant | Release Pressure Without Lubricant | Difference |
|---|---|---|---|
| 500 | 250 | 260 | 10 |
| 1000 | 200 | 240 | 40 |
| 1500 | 160 | 210 | 50 |
| 2000 | 120 | 200 | 80 |
| 2500 | 130 | 230 | 100 |
| 3000 | 160 | 330 | 170 |
| 3500 | 250 | 540 | 290 |
| 4000 | 390 | 900 | 510 |
| 4500 | 570 | infinite | infinite |
| 5000 | 400 | infinite | infinite |

Products obtained herein are substantially clear articles. Similar results will be observed when using the complex ester of Example I in the above. Higher complex esters (where R is above $C_{10}$) give cloudy articles. The release pressures indicate the highly effective nature of the claimed lubricants.

What is claimed is:

1. A process for the manufacture of a polycarbonate article including the steps of:
   (a) obtaining a polycarbonate resin;
   (b) mixing with the polycarbonate resin a sufficient lubricating amount of a complex ester of the structural formula:

$$[RCO_2CH_2]_3CCH_2O[CO(CH_2)_xCO_2CH_2C(CH_2O_2CR)_2CH_2O]_yCO(CH_2)_xCO_2CH_2C[CH_2O_2CR]_3$$

and,
   (c) the polycarbonate article is thereafter formed from a mixture of (a) and (b),
   wherein the above formula y has an average value of from 3 through 12; x has a value of 2 to 6 and R is an aliphatic hydrocarbon group of from 5 to 9 carbon atoms.

2. The process of claim 1 wherein (b) is present at from about 0.01% to about 1% by weight of (a).

3. The process of claim 1 wherein y is from 5 to 7.

4. The process of claim 1 wherein the polycarbonate article is substantially clear.

5. The process of claim 1 wherein x has a value of 2.

6. The process of claim 1 wherein x has a value of 4.

7. The process of claim 1 wherein x has a value of 6.

8. The process of claim 1 wherein the polycarbonate resin is a phenolic carbonate resin.

9. The process of claim 1 wherein R is linear.

10. The process of claim 1 wherein R is saturated.

* * * * *